D. VAUGHN.
VEHICLE SEAT.
APPLICATION FILED NOV. 8, 1915.

1,193,317.

Patented Aug. 1, 1916.
3 SHEETS—SHEET 1.

Inventor
David Vaughn
By Max A. Schmidt
Attorney

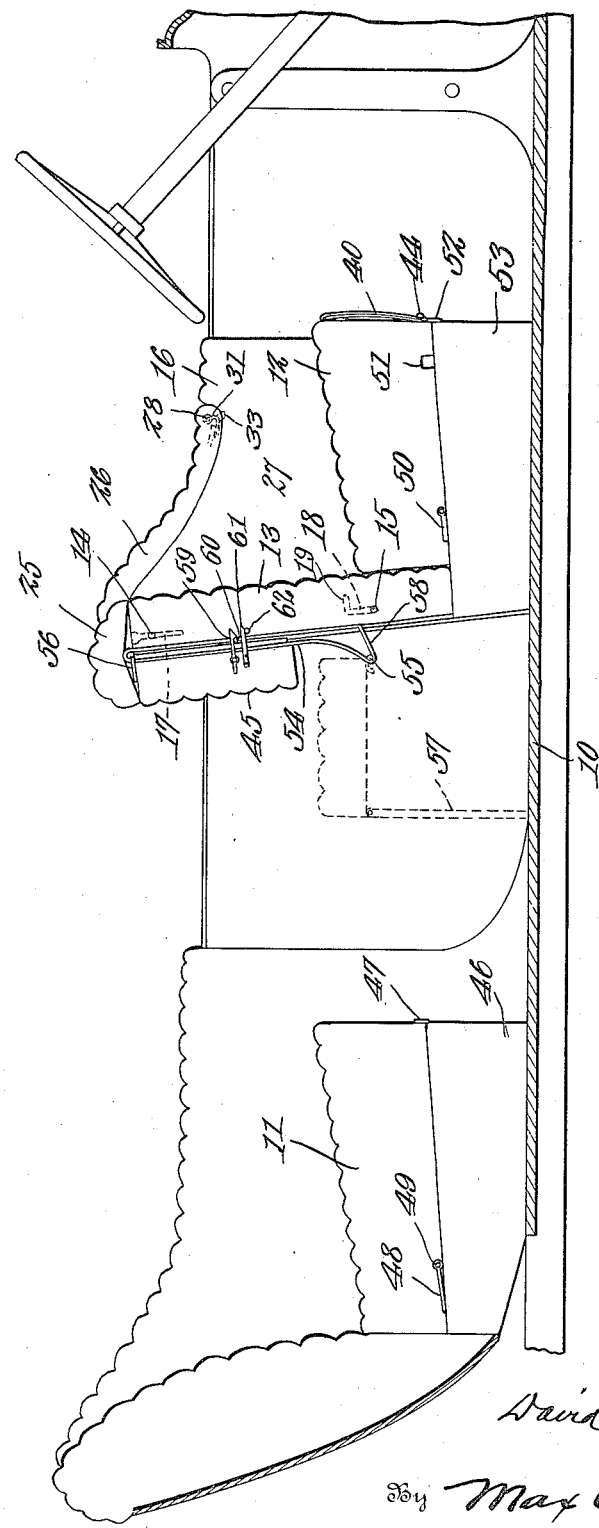

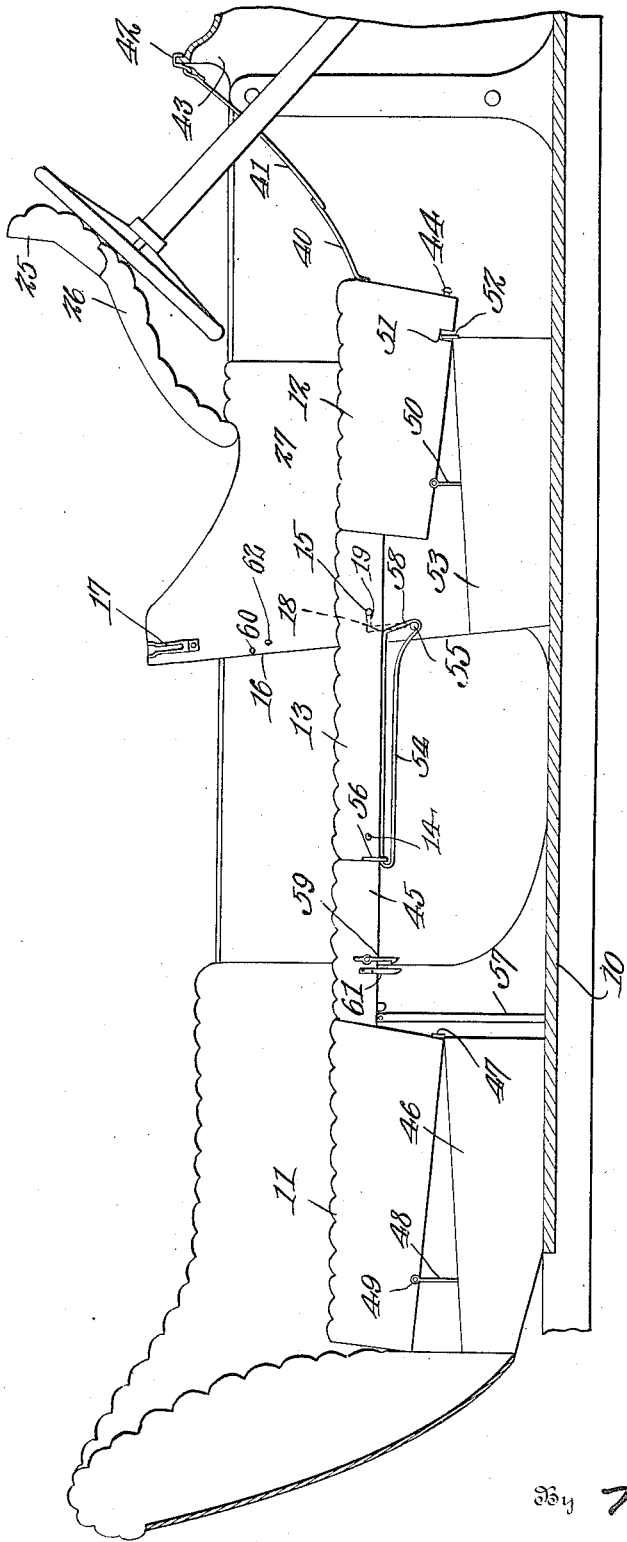

UNITED STATES PATENT OFFICE.

DAVID VAUGHN, OF WALLA WALLA, WASHINGTON.

VEHICLE-SEAT.

1,193,317.   Specification of Letters Patent.   Patented Aug. 1, 1916.

Application filed November 8, 1915. Serial No. 60,264.

*To all whom it may concern:*

Be it known that I, DAVID VAUGHN, a citizen of the United States, residing at Walla Walla, in the county of Walla Walla and State of Washington, have invented certain new and useful Improvements in Vehicle-Seats, of which the following is a specification.

This invention relates to convertible vehicle seats, and more especially to seats of this type applied to automobiles.

The present invention has for its object to provide a novel and improved combination and arrangement of parts whereby the seats of the car may be readily converted into a bed or bunk so that the car can be conveniently utilized for sleeping.

A further object of the invention is to provide an auxiliary seat which is so mounted that it may also be adjusted to form a part of the bed or bunk.

In order that the invention may be better understood, reference is had to the accompanying drawings, in which—

Figure 1:
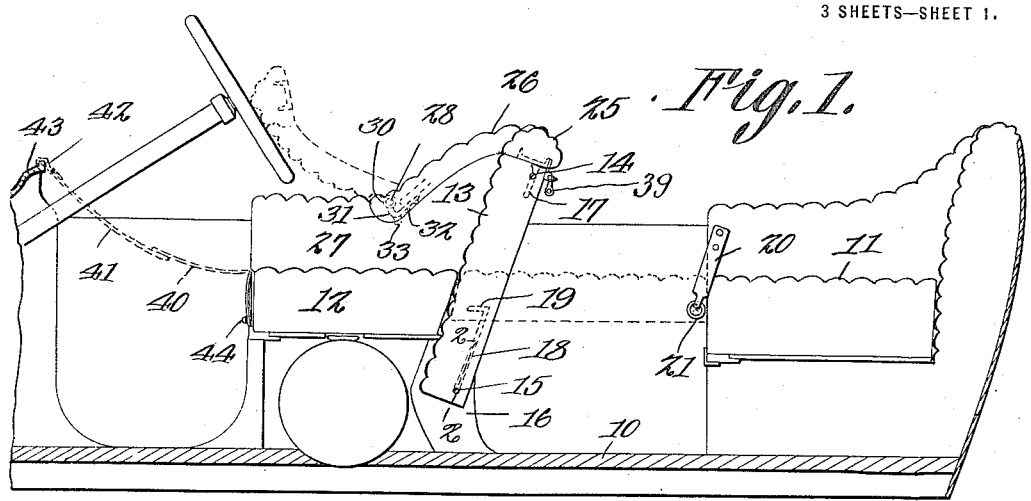
Figures 3, 5:
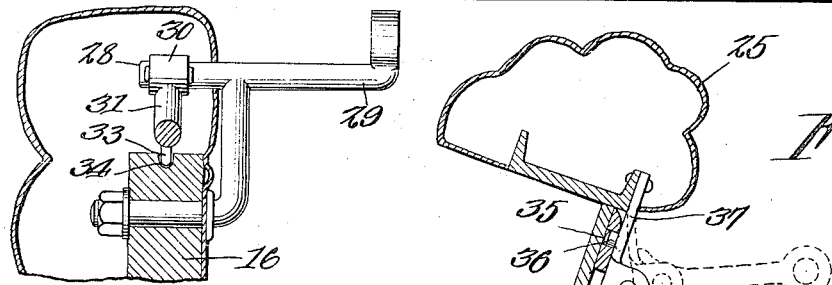
Figures 2, 4:
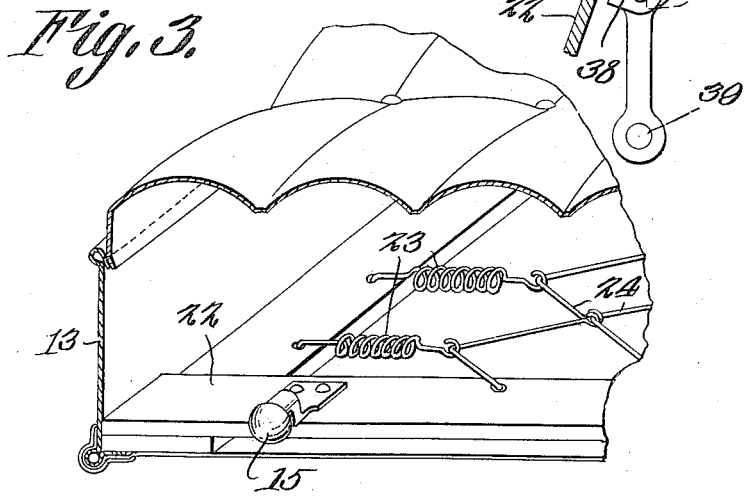

Figure 1 is a side elevation, partly in section, of the body of an automobile showing the application of the invention; Fig. 2 is an enlarged sectional detail on the line 2—2 of Fig. 1; Fig. 3 is a detail of a hinge structure; Fig. 4 is a detail illustrating a back rest structure; Fig. 5 is an elevation of a latch; Fig. 6 is a side elevation, partly in section, of an automobile body, showing a modification of the invention, and Fig. 7 is a similar view showing the parts in another position.

Referring specifically to the drawings, 10 denotes the floor of the car body, and 11 the usual movable cushion of the rear seat. The cushion of the front seat is indicated at 12, the same being also movably mounted on the seat base.

The back rest 13 of the front seat has headed studs or buttons 14 and 15 near its upper and lower ends, which slidably seat in slotted members made a part of the sides 16 of the car body. The top slot is shown at 17 and the bottom slot at 18. By means of these studs the back rest 13 is shiftably supported so that it may be lowered to serve as a part of a bed or bunk. The sliding connection between the back rest and the sides of the car body also permits the use of a longer back rest so that it may bridge the space between the front and rear seats when said seats are converted into a bed or bunk, as will be presently described, and the studs also act as a brace or support to hold the sides of the car body together. The studs are rigidly fastened to the back rest so that there will be a continuous support from one side of the car body to the other. The slots 17 and 18 have a slight taper on the inside and at the bottom, which, as the back rest seats itself, will make a tight joint and prevent rattling.

The slots 17 and 18 are vertical and parallel to the back rest 13, and the upper end of the slots 18 have forwardly extending branches 19 to afford a support for the back rest when the same is lowered for the bed or bunk, and being at a point a little above the center, the studs 15 still brace the sides 16 of the car body.

To support the rear end of the back rest 13 when it is in lowered position, there is attached to each side 16 of the car body a strap 20 carrying a ring 21 into which the stud 14 hooks. When not in use, the straps and rings are placed between the rear seat cushion 11 and the side of the car body. The slot 17 has an enlarged upper open end so that the stud 14 can be slipped out preparatory to lowering the back rest 13.

As shown in Fig. 4, the back rest 13 is composed of a spring steel frame 22 which holds the springs 23 and wires 24, said frame being upholstered in the usual way, with a back of carpet or other material; also the usual helical springs may be employed. The construction of the cushion is immaterial, except that the studs 14 and 15 must be rigidly connected, the connection being made with the frame 22 as shown.

On the top edge of the back rest 13 is mounted a cushion 25 which is connected to or in one piece with cushions 26 at the rear and top of the side cushions 27 of the front seat. This cushion 25 with its forwardly extending end portions 26 is hinged so that it may be swung upward and forward when the back rest 13 is lowered, as shown dotted in Fig. 1, the following hinge connection being provided for this purpose: On the stub end 28 of the bracket or iron 29 which supports the front end of the car top is pivoted a hinge member composed of a sleeve 30 having a curved arm 31 which is made fast to the frame of the part 26 in any suitable manner as indicated at 32. Both parts 26 are provided with this hinge connection. The arm 31 makes a downward curve and has a bottom lug 33 which seats slidably in a recess 34 in the top of the side wall 16 of the car, and holds the parts firm and rigid.

When the cushion 25 is in place on top of the back rest 13 it is held by a latch comprising the following parts: One of the frame members 22 has a keeper aperture 35 for a latch pin 36 carried by a spring shank 37 made fast to the frame of the cushion 25. The shank 37 has an outstanding ear 38 to which is hinged a robe rail 39. A latch as herein described is located at each end of the cushion 25 and said latches support the robe rail in the manner stated. When it is desired to elevate the cushion 25, the robe rail is pulled up to flex the shank 37 as shown dotted in Fig. 5 which withdraws the pins 36 from the aperture 35 and releases the cushion, after which the latter may be swung forward, the robe rail affording a handle for this purpose.

When the seats of the car are to be used as a bed or bunk, the cushion 25 is unlatched and swung forward so that it rests on the steering wheel of the car, and the back rest 13 is then swung down to extend horizontally between the front and rear seat cushions 12 and 11 as shown dotted in Fig. 1, in which position the back rest is supported by the rings 21 as herein before described. By swinging the cushion 25 forward as shown, there is had a free open space above the bunk. There is also provided a canvas or cloth front 40 which is attached to or made a part of the front cushion 12 and has straps 41 provided with hooks 42 for attachment to the dash 43. When not in use, the front cloth and its straps are folded up and supported on the front of the seat cushion by buttons 44.

The modified structure illustrated in Figs. 6 and 7 includes an auxiliary seat 45. The front and rear seat cushions are also inclined rearward, necessitating props to hold them level when converted into a bed or bunk. At the forward edge of the base 46 of the rear seat is an upstanding retaining flange 47 for the cushion 11, and on the bottom of the latter, near its rear end, is the prop 48 for the purpose stated, said prop being hinged, as indicated at 49, so that it may be folded flat under the cushion when not in use. The flange 47 prevents the cushion from slipping forward when it is propped up level. The hinged prop of the front seat cushion 12 is shown at 50. Near its forward end this cushion has a transverse bottom groove 51 in which seats an upstanding flange 52 on the base 53 of the front seat, when the cushion is propped up level, whereby it is held from slipping forward.

The back rest 13 carries the auxiliary seat 45 which latter is cushioned in the ordinary manner. This auxiliary seat, when not in use, folds to lie closely against the rear face of the back rest 13 at the top thereof, as shown in Fig. 6, and it is mounted so that it may be lowered into position for use, as shown dotted in Fig. 6. The auxiliary seat is also designed to form, in conjunction with the seat cushions 11 and 12, and the back rest 13, a bunk or bed as will be presently described.

The following means are provided for adjustably mounting the auxiliary seat 45 on the back rest 13: On the rear face of the back rest 13 are mounted, in spaced relation therewith, vertically arranged rods 54 extending down from the top of the back rest a suitable distance. At their lower ends the rods are carried forward and support a robe rail 55. The upper end of the auxiliary seat which is at the top when said seat is folded, carries links 56 which are slidably mounted on the rods. Thus the auxiliary seat may be slid down and swung outward to horizontal position for use, as shown dotted in Fig. 6, in which position it will be held by hinged props 57. The lower ends of the rods are bent back as indicated at 58 to form stops which limit the downward movement of the links and support the end of the seat next to the back rest, the outer end being supported by the props 57.

When the auxiliary seat 45 is folded out of the way back against the back rest 13, it is held up in this position by latches 59 hooking over pins 60 fixed to the sides 16 of the car body, and said seat is further supported by end bars 61 resting on pins 62 fixed to the sides of the car body. The bars 61 support the weight of the auxiliary seat, while the latches 59 hold the same in folded position.

When the parts are to be converted into a bed or bunk, the back rest 13 is swung down to horizontal position, and the auxiliary seat is folded upward to come in line therewith, so that the back rest and the auxiliary seat extend between the front and rear seats of the car. The seat cushions 11 and 12 are also shifted forward and propped up to come level with the back rest and the auxiliary seat as shown in Fig. 7. The back rest and the auxiliary seat are held in this position by the props 57.

The auxiliary seat structure is especially designed for large cars where the space between the front and rear seats is so great that it will accommodate an extra seat. The robe rail 39 used in connection with the first described structure, will be eliminated and any suitable locking means for the cushion 25 may be substituted for the means 36.

While the preferred embodiment of the invention has been shown and described, it will be evident that various changes and modifications may be made without a departure from the spirit and scope of the invention as claimed hereinafter.

I claim:

1. The combination with the front and rear seats of a vehicle; of a back rest for the front seat movably supported and adjustable to extend horizontally between the said seat and the rear seat, means for supporting the back rest in horizontal position, top cushions for the sides of the front seat hinged to said sides to swing upward and forward, and a top cushion for the back rest connected to the first-mentioned cushions to swing therewith.

2. The combination with the front and rear seats of a vehicle; of a back rest for the front seat movably supported and adjustable to extend horizontally between the said seat and the rear seat, means for supporting the back rest in horizontal position, and a top cushion for the back rest pivotally supported to swing upward and forward.

3. The combination with a vehicle having vertically slotted supporting members on the side walls, and front and rear seats; of a back rest for the front seat adjustable to extend horizontally between said seat and the rear seat, and studs on the side edges of the back rest, said studs seating slidably in the slots of the aforesaid supporting members and being located, respectively, adjacent to the top and bottom of the back rest, and the slots of the supporting members being correspondingly located and running parallel to the back rest, the bottom slot having a lateral branch at its upper end.

4. The combination with a vehicle having vertically slotted supporting members on the side walls, and front and rear seats; of a back rest for the front seat adjustable to extend horizontally between said seat and the rear seat, and studs on the side edges of the back rest, said studs seating slidably in the slots of the aforesaid supporting members and being located, respectively, adjacent to the top and bottom of the back rest, and the slots of the supporting members being correspondingly located and running parallel to the back rest, the bottom slot having a lateral branch at its upper end, and the top slot being open at its upper end.

5. The combination with the front and rear seats of a vehicle; of a back rest for the front seat movably supported and adjustable to extend horizontally between said seat and the rear seat, a swinging and vertically slidable auxiliary seat supported on the back rest, said seat being foldable against the back rest, and also adjustable to extend with the same horizontally between the front and rear seats, and means for supporting said auxiliary seat and the back rest in horizontal position.

6. The combination with the front and rear seats of a vehicle; of a back rest for the front seat movably supported and adjustable to extend horizontally between said seat and the rear seat, vertical rods mounted on the back of said back rest in spaced relation therewith, an auxiliary seat, and links on said seat slidably mounted on the rods to provide a sliding and swinging support for the auxiliary seat, said seat being foldable against the back rest, and also adjustable to extend with the same horizontally between the front and rear seats, and means for supporting said auxiliary seat and the back rest in horizontal position.

In testimony whereof I affix my signature in the presence of two witnesses.

DAVID VAUGHN.

Witnesses:
E. E. SAUGE,
C. W. WILBUR.